(12) United States Patent
Roy

(10) Patent No.: US 9,528,279 B2
(45) Date of Patent: Dec. 27, 2016

(54) ENTANGLED NET PRODUCT WITH CRUMB

(71) Applicant: Kenneth A. Roy, Shapleigh, ME (US)

(72) Inventor: Kenneth A. Roy, Shapleigh, ME (US)

( * ) Notice: Subject to any disclaimer, the term of this patent is extended or adjusted under 35 U.S.C. 154(b) by 0 days.

(21) Appl. No.: 14/859,689

(22) Filed: Sep. 21, 2015

(65) Prior Publication Data

US 2016/0090745 A1 Mar. 31, 2016

Related U.S. Application Data

(60) Provisional application No. 62/056,657, filed on Sep. 29, 2014.

(51) Int. Cl.
| | |
|---|---|
| *E04F 15/20* | (2006.01) |
| *B32B 5/02* | (2006.01) |
| *B32B 5/16* | (2006.01) |
| *B32B 7/12* | (2006.01) |
| *B32B 37/02* | (2006.01) |
| *B32B 37/12* | (2006.01) |
| *B32B 37/24* | (2006.01) |
| *B32B 5/00* | (2006.01) |
| *B32B 5/06* | (2006.01) |
| *B32B 5/12* | (2006.01) |

(Continued)

(52) U.S. Cl.
CPC ............. *E04F 15/203* (2013.01); *B32B 5/00* (2013.01); *B32B 5/02* (2013.01); *B32B 5/022* (2013.01); *B32B 5/028* (2013.01); *B32B 5/06* (2013.01); *B32B 5/12* (2013.01); *B32B 5/16* (2013.01); *B32B 5/18* (2013.01); *B32B 5/22* (2013.01); *B32B 7/00* (2013.01); *B32B 7/02* (2013.01); *B32B 7/12* (2013.01); *B32B 27/06* (2013.01); *B32B 27/08* (2013.01); *B32B 27/12* (2013.01); *B32B 37/02* (2013.01); *B32B 37/1284* (2013.01); *B32B 37/24* (2013.01); *B32B 2262/00* (2013.01); *B32B 2264/00* (2013.01); *B32B 2264/02* (2013.01); *B32B 2264/0207* (2013.01); *B32B 2264/0221* (2013.01); *B32B 2266/00* (2013.01); *B32B 2305/30* (2013.01); *B32B 2305/38* (2013.01); *B32B 2307/10* (2013.01); *B32B 2307/102* (2013.01); *B32B 2307/7242* (2013.01); *B32B 2307/7265* (2013.01); *B32B 2419/00* (2013.01); *B32B 2419/04* (2013.01); *B32B 2471/00* (2013.01)

(58) Field of Classification Search
CPC ........ E04F 15/203; E04F 15/22; E04F 15/206; B32B 5/028
USPC .................. 181/290, 291; 52/403.1
See application file for complete search history.

(56) References Cited

U.S. PATENT DOCUMENTS

| 3,952,126 A * | 4/1976 | Dycks ...................... D04H 1/46 156/148 |
| 4,685,259 A | 8/1987 | Eberhart et al. |

(Continued)

*Primary Examiner* — Jeremy Luks
(74) *Attorney, Agent, or Firm* — Hammer & Associates, P.C.

(57) ABSTRACT

An entangled net having a crumb dispersed therein may be used as a sound deadening material in a flooring system. The crumb may be adhered to said entangled net. The entangled net may include a first barrier layer affixed to an upper surface of said entangled net and/or a second barrier layer affixed to a lower surface of said entangled net. The crumb may be selected from the group consisting of: rubber; foam; natural elastic materials; synthetic elastic materials; fibers; and combinations thereof. The method of use and manufacture are also disclosed.

17 Claims, 2 Drawing Sheets

(51) Int. Cl.

| | |
|---|---|
| *B32B 5/18* | (2006.01) |
| *B32B 5/22* | (2006.01) |
| *B32B 7/00* | (2006.01) |
| *B32B 7/02* | (2006.01) |
| *B32B 27/06* | (2006.01) |
| *B32B 27/08* | (2006.01) |
| *B32B 27/12* | (2006.01) |

(56) References Cited

U.S. PATENT DOCUMENTS

| | | |
|---|---|---|
| 4,753,841 A | 6/1988 | Noel et al. |
| 5,187,905 A | 2/1993 | Pourtau et al. |
| 6,568,142 B2 | 5/2003 | Yoshida |
| 7,096,630 B1 | 8/2006 | Keene et al. |
| 7,861,484 B2 | 1/2011 | Pavan et al. |
| 8,146,310 B2 | 4/2012 | Keene |
| 8,393,438 B2 | 3/2013 | Ogawa et al. |
| 8,505,255 B2 | 8/2013 | Döhring et al. |
| 8,528,286 B2 | 9/2013 | Keene |
| 8,544,218 B2 | 10/2013 | Dellinger et al. |
| 8,622,169 B2 | 1/2014 | Kim et al. |
| 8,631,900 B2 | 1/2014 | Miyake et al. |
| 8,707,646 B2 | 4/2014 | Keane |
| 2006/0144012 A1 | 7/2006 | Manning et al. |
| 2006/0230699 A1 | 10/2006 | Keene |
| 2009/0242325 A1* | 10/2009 | Dellinger ............... E04B 1/84 181/290 |

\* cited by examiner

US 9,528,279 B2

ENTANGLED NET PRODUCT WITH CRUMB

RELATED APPLICATION

This application claims the benefit of U.S. Provisional Application Ser. No. 62/056,657 filed Sep. 29, 2014, incorporated herein by reference.

FIELD OF THE INVENTION

The entangled net product with crumb may be used as a sound deadening product in flooring systems.

BACKGROUND OF THE INVENTION

The transmission of sound through a flooring system is of great concern, especially in multi-family dwellings. The ability of the flooring system not to transmit sound from one living space to the next is greatly desired.

In many multi-family dwelling, the flooring system uses a gypsum (or cementitious) material covering over a subfloor structure. While the gypsum material has some inherent sound deadening properties, those properties are not sufficient to meet the higher standards now being sought by the building industry.

The industry has looked at the use of various forms of entangled net to address the sound deadening issue, see, for example, U.S. Pat. No. 7,096,630, US2006/0230699; U.S. Pat. No. 8,146,310; U.S. Pat. No. 8,544,218; and U.S. Pat. No. 8,528,286, each incorporated herein by reference. While each of these solutions have provided an advancement, the industry is still looking for greater sound deadening properties.

Entangled nets are known, for example see U.S. Pat. No. 7,096,630, US2006/0230699; U.S. Pat. No. 8,146,310; U.S. Pat. No. 8,544,218; and U.S. Pat. No. 8,528,286, each incorporated herein by reference. Entangled nets may be in two general forms: 1) a solid formed of a plurality of entangled fibers (filaments or continuous fibers), for example see U.S. Pat. No. 7,096,630, U.S. Pat. No. 8,146,310, and U.S. Pat. No. 8,544,218; or 2) a sheet of entangled fibers (filaments or continuous fibers) where the sheet is folded (eg, forming a sine curve in cross-section or 'peaks and furrows' (or 'W')) or dimpled (eg, cone-shaped) to create a three-dimensional solid, for example see U.S. Pat. No. 8,528,286 and U.S. Pat. No. 8,146,310.

Accordingly, there is a need for new sound deadening products that meet or exceed the performance of the foregoing products.

SUMMARY OF THE INVENTION

An entangled net having a crumb dispersed therein may be used as a sound deadening material in a flooring system. The crumb may be adhered to said entangled net. The entangled net may include a first barrier layer affixed to an upper surface of said entangled net and/or a second barrier layer affixed to a lower surface of said entangled net. The crumb may be selected from the group consisting of: rubber; foam; natural elastic materials; synthetic elastic materials; fibers; and combinations thereof. The method of use and manufacture are also disclosed.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

The invention may be characterized as: an entangled net including crumb (an article of manufacture); a sound deadening product (or method for sound deadening) having an entangled net including crumb; and a method for making an entangled net including crumb.

Figure 1:
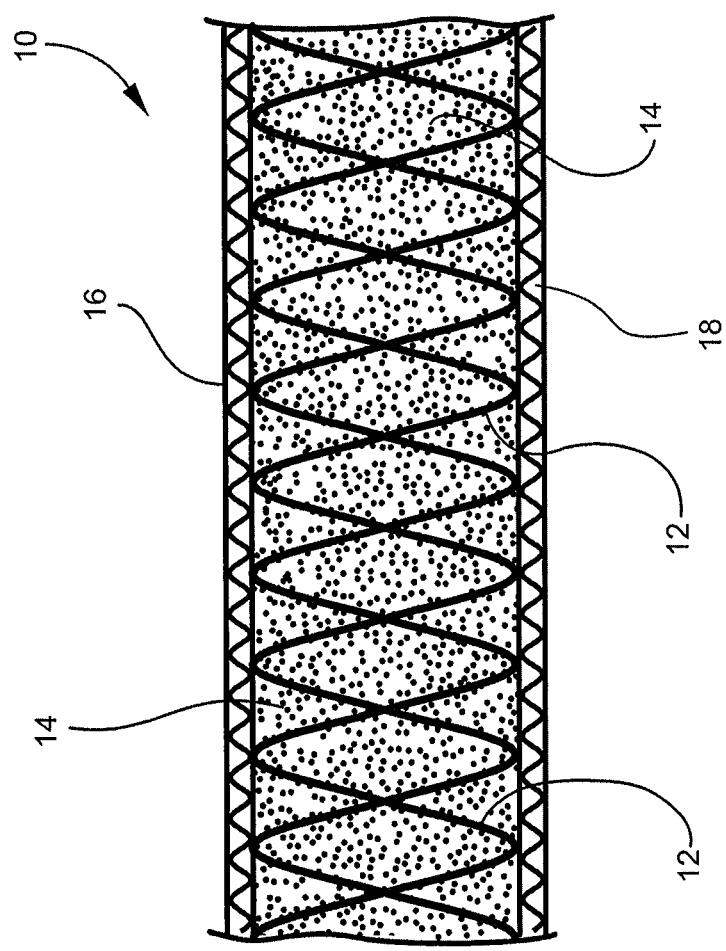
FIG. 1 shows an embodiment of the instant invention.

Referring to the drawings, where like elements have like numerals, there is shown, in FIG. 1, an embodiment of the entangled net with crumb 10. In general, the entangled net with crumb 10 includes an entangled net 12 including crumb 14. Additionally, the invention 10 may include a first barrier layer 16 affixed on an upper surface of the entangled net 12. Additionally, the invention 10 may include a second barrier layer 18 affixed on a lower surface of the entangled net 12. The entangled net with crumb 10 may include both barrier layers, neither barrier layer, or just one of the barrier layers.

Entangled nets may be in either of two general forms: 1) a solid formed of a plurality of entangled fibers (filaments or continuous fibers), for example see U.S. Pat. No. 7,096,630, U.S. Pat. No. 8,146,310, and U.S. Pat. No. 8,544,218; or 2) a sheet of entangled fibers (filaments or continuous fibers) where the sheet is folded (eg, forming a sine curve in cross-section or 'peaks and furrows' (or 'W')) or dimpled (e.g., cone-shaped) to create a three-dimensional solid, for example see U.S. Pat. No. 8,528,286. Entangled nets are known, for example see U.S. Pat. No. 7,096,630, US2006/0230699; U.S. Pat. No. 8,146,310; U.S. Pat. No. 8,544,218; and U.S. Pat. No. 8,528,286, each incorporated herein by reference. In general, the fibers of the entangled net create an open solid (open in the sense of the interstitial spaces between the fibers).

The crumb 14 may be any crumb material. When the entangled net with crumb is used as a sound deadening product, the crumb should have sound deadening properties. In general, sound deadening properties refers to the ability to absorb acoustical energy. Such crumb may generally be elastic, but is not necessarily so. Examples of crumb having such sound deadening properties include: rubber (e.g., crumb and/or sponge and/or cross-linked and/or non crosslinked); foam (e.g., closed cell and/or opened cell); natural elastic materials (e.g., cork); synthetic elastic materials; fibers—any length and any diameter) (e.g., cellulosic, thermoplastic (e.g., polyolefin, amide, acrylic); and combinations thereof. The crumb may have any diameter. In one embodiment, the crumb has a diameter no greater than $\frac{1}{8}$" (0.125 inch).

The crumb may be adhered to the entangled net. Any adhesive may be used. Such adhesives include, but are not limited to: hot-melt adhesives (elastic, inelastic, tacky, non-tacky), pressure-sensitive adhesives, energy activated adhesives (activated by heat, IR, etc), moisture activated adhesives, two component adhesives, and combinations thereof. In sound deadening application, any adhesive having sound deadening properties may be used; but, sound deadening properties are not necessary. Such adhesives include those mentioned above that have sound deadening properties. In some embodiments, the adhesive remains tacky, so that the tacky entangled net, when exposed, may be used to adhere the product to the subflooring to facilitate installation (ie, hold the product in place during floor installation without the need of nails or staples to hold the product in place).

The first barrier layer (optional) may be any sheet or film material. The first barrier may, for example, be used to: prevent the ingress of foreign materials into the product during use, and/or the loss of crumb during manufacture. When used in flooring systems, such as the cementitious flooring systems, the first barrier layer may be any material that is at least water impermeable, but may be water impermeable and moisture permeable. Such materials may include nonwovens (for example spunbonded, meltblown, and or spunmelt nonwovens). The first barrier layer is adhered to the entangled net is any conventional fashion.

The second barrier layer (optional) may be any sheet or film material. The second barrier layer may, for example, be used to: prevent the loss of crumb after manufacture; and/or as a release layer, so when the product is wound (product typically sold as roll goods), it does not adhere to itself; and/or as a sound deadening layer; and/or a peelable layer so that the tacky entangled net may be exposed to facilitate installation. The second barrier layer may be a foam or nonwoven or fabric (woven or knitted) or a film (perforated or nonperforated), or combinations thereof.

Figure 2:
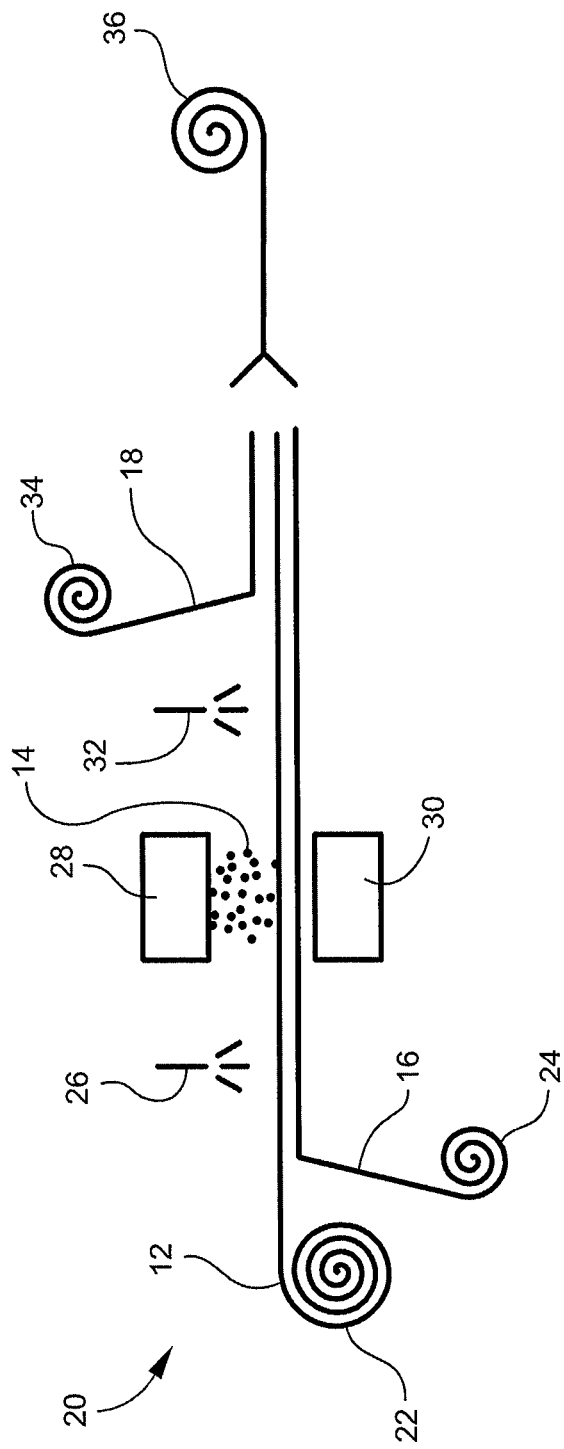
FIG. 2 illustrates a method of manufacturing the instant invention.

In FIG. 2, a method of manufacturing the invention is illustrated. The entangled net 12 may be unwound 22 (or taken directly from its manufacture) to a station 28 where crumb 14 is added. The adhesive may be added to the entangled net before 26 crumb addition, or after 32 crumb addition, or before and after crumb addition. The use of a vacuum station 30 may be used to facilitate crumb distribution within the entangled net 12. The first barrier layer 16 may be added 24 to the entangled net 12 before crumb addition (note in this embodiment, the first battier layer is located on the bottom surface of the entangled net). The second barrier layer may be added 34 to the entangled net after crumb addition (note in this embodiment, the second battier layer is located on the upper surface of the entangled net). After formation of the invention, the product may be wound-up 36 to form a roll good. Alternatively, the entangled net 12 and the first barrier layer 16 may be made before the addition 26 of the crumb.

In use, the entangled net with crumb is installed on top of the subfloor of the building (e.g., a multi-family dwelling). If the barrier layers are used, the first barrier layer faces up (e.g., toward the cementitious or gypsum layer), and the second layer (or bottom surface of the entangled net with crumb) faces down (e.g., toward the subfloor). All or a portion of the second layer may be removed (or peeled back), so that the adhesive may be used to secure the entangled net with crumb to the subfloor. After installation of the entangled net with crumb over the subfloor, the cementitious or gypsum layer may be poured over the entangled net with crumb.

The present invention may be embodied in other forms without departing from the spirit and the essential attributes thereof, and, accordingly, reference should be made to the appended claims, rather than to the foregoing specification, as indicating the scope of the invention.

I claim:

1. A method for reducing sound transmission through a flooring system including a cementitious material comprising the step of:
   providing an entangled net having a sound-deadening crumb dispersed within the entangled net, the entangled net being either a solid formed of continuous filaments or a sheet of continuous filaments with folds or dimples, and having interstitial spaces between the filaments, the crumb has an average diameter no greater than ⅛"; a first barrier layer affixed to an upper surface of the entangled net, the first barrier layer is a water impermeable and moisture permeable nonwoven; and a second barrier layer affixed to a lower surface of the entangled net, and the second barrier layer prevents loss of crumb during manufacture and/or is a release layer.

2. The method of claim 1 wherein the crumb is adhered to the filaments of the entangled net.

3. The method of claim 1 wherein the first barrier layer is a spunbonded, meltblown or spunmelted nonwoven.

4. The method of claim 1 wherein the second barrier layer is a foam, nonwoven, fabric, film or a combination thereof.

5. The method of claim 1 wherein the crumb is loose packed within the interstitial spaces of the entangled net.

6. The method of claim 1 wherein the crumb is selected from the group consisting of: rubber; foam; natural elastic materials; synthetic elastic materials; fibers; and combinations thereof.

7. An article for manufacture for reducing sound transmission through a cementitious flooring system comprising an entangled net having a sound-deadening crumb dispersed within said entangled net, said entangled net being either a solid formed of continuous filaments or a sheet of continuous filaments with folds or dimples, and having interstitial spaces between the filaments, the crumb has an average diameter no greater than ⅛"; a first barrier layer affixed to an upper surface of the entangled net, the first barrier layer is a water impermeable and moisture permeable nonwoven; and a second barrier layer affixed to a lower surface of the entangled net, and the second barrier layer prevents loss of crumb during manufacture and/or is a release layer.

8. The article of claim 7 wherein said crumb is adhered to said filaments of said entangled net.

9. The article of claim 7 wherein the first barrier layer is a spunbonded, meltblown or spunmelted nonwoven.

10. The article of claim 7 wherein the second barrier layer is a foam, nonwoven, fabric, film or a combination thereof.

11. The article of claim 7 wherein said crumb is loose packed within the interstitial spaces of the entangled net.

12. The article of claim 7 wherein said crumb is selected from the group consisting of: rubber; foam; natural elastic materials; synthetic elastic materials; fibers; and combinations thereof.

13. A method of making an entangled net for reducing sound transmission through a cementitious flooring system having a sound-deadening crumb dispersed therein comprising the steps of:
   adhering the sound-deadening crumb to filaments of the entangled net, the entangled net being either a solid formed of continuous filaments or a sheet of continuous filaments with folds or dimples, and having interstitial spaces between the filaments, and the crumb has an average diameter no greater than ⅛";
   adding a first barrier layer to an upper surface of the entangled net, the first barrier layer is a water impermeable and moisture permeable nonwoven; and
   adding a second barrier layer to a lower surface of the entangled net, and the second barrier layer prevents loss of crumb during manufacture and/or is a release layer.

14. The method of claim 13 wherein adhering further comprising: applying an first adhesive to the entangled net and then adding the crumb; or applying a first adhesive to the entangled net, adding the crumb, and then applying a second adhesive to the entangled net; or adding the crumb to the entangled net, and then applying a first adhesive to the entangled net.

15. The method of claim 13 further comprising vacuuming the crumb into the entangled net.

16. The method of claim 13 wherein the first barrier layer is a spunbonded, meltblown or spunmelted nonwoven.

17. The method of claim 13 wherein the second barrier layer is a foam, nonwoven, fabric, film or a combination thereof.

* * * * *